United States Patent Office 3,190,925
Patented June 22, 1965

3,190,925
MONOMERIC ALKENYL BENZYL
POLYGLYCOL ETHERS
Stephen C. Stowe, Midland, Mich., assignor to The Dow
Chemical Company, Midland, Mich., a corporation of
Delaware
No Drawing. Filed June 25, 1962, Ser. No. 205,090
2 Claims. (Cl. 260—611)

The present application is a continuation-in-part of herewith abandoned copending application for United States Letters Patent Serial No. 832,443, filed August 10, 1959.

The present invention resides in the general field of organic chemistry and contributes specifically to the art of providing polymerizable, ethylenically unsaturated monomeric materials that are especially well suited to being copolymerized with various other ethylenically unsaturated monomeric materials or graft copolymerized on preformed polymer (advantageously addition polymer) substrates. More particularly, the present invention pertains to certain polymerizable monomeric alkenyl, especially vinyl, benzyl polyglycol ethers of the variety hereinafter more fully delineated.

The chief aim and concern of the present invention is to possibilitate and make available, as new compositions of matter, the presently contemplated alkenyl benzyl polyglycol ether monomers which, among other applications, are advantageously: (1) copolymerizable with other monomeric materials that normally polymerize to hydrophobic polymer products and (2) graft copolymerizable on and with normally hydrophobic preformed polymer substrates in order to obtain generally more hydrophilic and humectant materials. A particular design of the invention is the realization of a monomeric material desirably adapted, by employment and conversion in the mentioned manner, to prepare various polymer products, including copolymer and graft copolymer products, which have significant utility as additives for synthetic textile fibers, such as acrylonitrile polymer fibers, in the capacity of anti-static agents or humectant dye-receptors (i.e., dye-assisting adjuvants for many of a wide variety of dyestuffs), or stabilizing ingredients, or more than one of the indicated possibilities.

The several features of the present invention and the means by which the instant desiderations and intendments are achieved are more fully manifest in the ensuing specification and description.

The alkenyl benzyl polygycol ether monomers of the present invention are of the general formula:

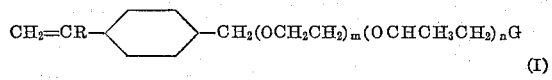

(I)

wherein R is hydrogen or methyl and G is selected from the group consisting of hydrogen, alkyl radicals containing not more than 6 carbon atoms, alkoxy radicals containing from 1 to about 8 carbon atoms (i.e., —OCH₃, —OC₂H₅, and other —OR groups), alkylthio radicals containing from 1 to about 8 carbon atoms ( i.e., —SCH₃, —SC₂H₅, and other —SR radicals) and halogens of atomic number 17 to 53 (i.e., chlorine, bromine and oidine); $m$ is the number of ethylene glycol groups having an average value from about 2 to about 40; $n$ is the number of propylene glycol groups that includes 0 and has an average value that may be as large as about 20 but is never larger than the value of $m$, and the sum of the average numerical value of $m$ plus $n$ is from about 2 to about 40. In the instant monomers, the ring-substituted vinyl (—CH=CH₂) radical may be ortho, meta or para on the phenyl nucleus relative to the benzyl radical. Likewise, the monomeric product may be obtained in forms of mixtures wherein the alkenyl substituent is present on the phenyl nucleus in various positions.

The monomeric alkenyl benzyl polyglycol ether that is employed may have a molecular weight between about 200 and about 2,000, advantageously from about 236 to 1200.

Typically advantageous species of monomers according to the present invention are 1-(2-ethoxyethoxy)-2(para-vinyl benzyloxy)ethane (e.g., according to Formula I, where R is hydrogen, $m$ is 2 and $n$ is 0); vinyl monomers wherein $m$ is about 15 and $n$ is 0 in Formula I; and vinyl monomers wherein $m$ is about 20 and $n$ is 2 in Formula I, particularly in the latter two cases when G is methoxy or ethoxy as further exemplified by such species as a polyglycol-2-vinylbenzyloxyethane derived as indicated from a polyoxyethylene glycol having an average molecular weight of about 200–600, advantageously from about 500 to 600.

Other monomers in accordance with the present invention and which (as is apparent to those skilled in the art) can be readily prepared by the below mentioned techniques, using appropriate known starting materials for the purpose, include:

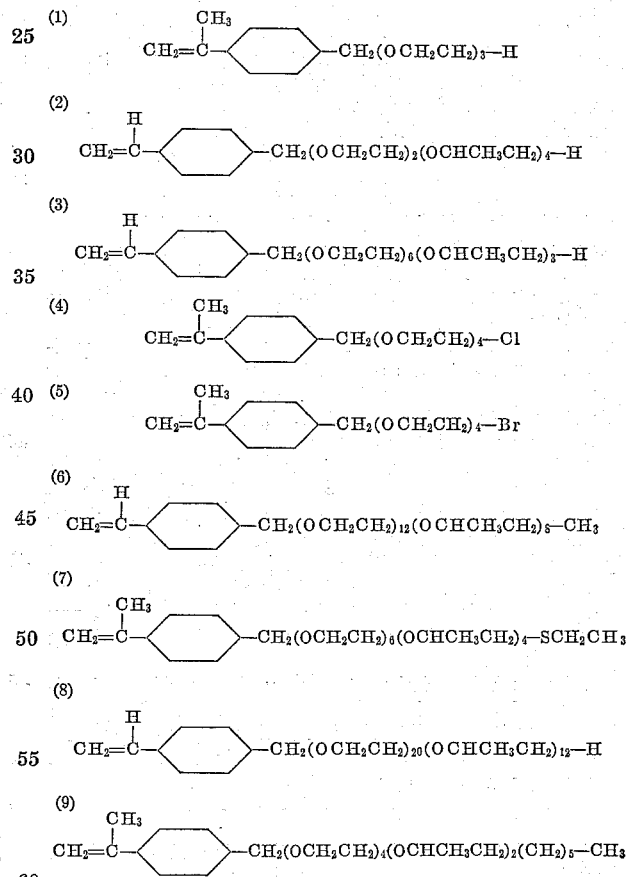

The present monomeric alkenyl, benzyl polygycol ethers are readily prepared by the reaction between vinyl benzyl chloride (or isopropenyl benzyl chloride) and a suitable polyglycol or polyglycol derivative to provide a polyglycol moiety in the monomer of the above-indicated scope. The reaction that is involved is analogous and proceeds in a way generally similar to that between benzyl chloride and simple alcohols, as discussed at page 1167 of "Organic Chemical Compounds" by E. H. Huntress (Wiley & Sons, 1948). When an unmodified polyglycol is employed in preparation of a monomeric product according to the present invention, it is ordinarily advantageous to conduct the reaction with a large excess of the polyglycol. This tends to avoid reaction on both ends of the polyol so as to preclude formation of polyfunctional divinyl (or diisopropenyl) monomer products that tend to cross-link on polymerization. Such expedient is usually unnecessary when the monomers are prepared from polyglycol derivatives.

Another method especially useful in obtaining a wide variety of the subject monomeric materials is to react 4-vinyl benzyl alcohol or its homologues such as isopropenyl benzyl alcohol, vinyl phenyl ethyl alcohol, vinyl phenol (hydroxy styrene), isopropenyl phenol, etc. with ethylene oxide to produce the corresponding polyglycol ether. The chain length of the polyethylene glycol ether moiety is controlled as desired by the concentration of ethylene oxide and the temperature of reaction.

Modifications of the above procedure, obvious to those skilled in the art, may be employed to obtain specific species of the indicated generic scope. For example, sodium vinyl phenate may be reacted with chlorohydrines of polyglycols or their tosylates (J. Am. Chem. Soc., 59, 228 (1937)) to obtain the corresponding ethers. Still another technique which is useful at times is the preparation of 2-bromoethyl benzyl ethers of polyglycols and their derivatives followed by dehydrobromination to produce the desired vinyl compound.

The monomers of the present invention are copolymerizable, in any desired proportion, with such other ethylenically unsaturated monomers as vinyl cyanide (e.g., arcylonitrile), vinyl chloride, vinyl acetate, styrene, vinyl toluene, the several chlorostyrenes, various sulfonated styrenes and other vinyl sulfonic acids, and many other polymerizable ethylenically unsaturated monomeric materials characterized in having the presence of $$>CH=CH_2$$

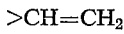

units therein, as will appear to those skilled in the art, to provide useful copolymer products. The monomers are also graft copolymerizable on various preformed polymer substrates, such as on acrylonitrile polymer substrates, particularly polyacrylonitrile, vinyl lactam polymer substrates, particularly poly-N-vinyl-2-pyrrolidone, and so forth to provide useful graft copolymer products. As might be expected, homopolymer products or copolymer products of more than one of the present monomers may also be obtained.

Ordinarily, the humectant properties of the polymer products prepared with the monomers of the present invention depend to a large extent on the quantity or proportion of the monomeric alkenyl benzyl polyglycol ether polymerized therein, with greater included amounts generally yielding more hydrophilic products. All this, of course, depends on the specific materials utilized in any given instance and the particular type of product being prepared.

Without being limited to or by the specific embodiments set forth, the invention is further exemplified in and by the following didactic illustrations, wherein, unless otherwise indicated, all parts and percentages are to be taken on a weight basis.

ILLUSTRATION "A"

About 100 grams of solid caustic (NaOH) was stirred with 300 grams of the mono methyl ether of diethylene glycol. The caustic went partially into solution. About 252 cc. of vinyl benzyl chloride, containing about 0.01 weight percent of tertiary butyl catechol, was then slowly added thereto. The heat of reaction caused the temperature to rise to a maximum of 90° C., despite the fact that ice water was used to cool the flask. Nonetheless, the temperature was quickly controlled and thereafter maintained (during most of the reaction) at 50°-60° C.

The reaction mass was then cooled and the solid NaCl filtered off. The solid contained about 2.08 gram moles of NaCl. There was about 0.05 gram mole of chloride ion in the 592 grams of filtrate.

A portion of this filtrate was distilled and about half of the initial charge was recovered as a distillate fraction boiling at 144°-150° C./0.3 mm. Hg. This fraction was a pale yellow oil. The monomer product had a density, at 25° C., of about 1.03 grams per cubic centimeter. Its equivalent weight by bromide-bromate titration was 120, with 118 being exactly theoretical therefor. On spectrographic analysis it conformed to the expected pattern.

ILLUSTRATION "B"

About 30 grams (0.53 mole) of caustic potash (KOH) was dissolved in about 450 cc. of polyethylene glycol having a molecular weight of about 200 and a density, at 25° C., of about 1.125 grams per cubic centimeter. The mixture was stirred while there was slowly added thereto about 70 cc. of vinyl benzyl chloride, taking care that the temperature of the reaction mass did not exceed about 70° C. during addition of the reagent. After final addition of the vinyl benzyl chloride, the reaction mass was stirred for an additional two hours then permitted to stand overnight.

Solid KCl which had formed in the reaction mass was filtered out. There remained about 565 gms. of a clear brown solution. This was then shaken with about 1 liter of 20 percent aqueous calcium chloride solution to extract the unreacted glycol. From this, about 106 gms. of an oil layer was recovered which contained about 0.325 mole of the desired monomer product, as determined by bromide-bromate titration. The monomer obtained had a molecular weight of about 316 and was at least about 97 percent pure.

ILLUSTRATION "C"

The monomer of the second illustration was employed to prepare three emulsion polymerization copolymers with acrylonitrile following standard emulsion techniques and employing a free-radical generating catalyst.

In one batch about 95 percent, based on weight of charged comonomer, of acrylonitrile was copolymerized with 5 percent of the vinyl benzyl polyglycol ether. In another about 90 percent of acrylonitrile was employed; and in the third about 85 percent of acryonitrile was utilized. The copolymer product of the first batch was found to contain about 92 percent of polymerized acrylonitrile with about 8 percent of the polymerized vinyl benzyl polyglycol ether. The copolymer from the second batch contained 89 percent polymerized acrylonitrile, with the balance being the polymerized ether monomer; and the copolymer from the third batch contained about 80 percent of polymerized acrylonitrile with the balance being the ether monomer copolymerized therewith.

All of the copolymer products had good fiber-forming properties, were humectant and relatively hydrophilic in nature as compared with polyacrylonitrile and were readily dyeable with any of a wide variety of dyestuffs.

ILLUSTRATION "D"

Into a 500 ml. reactor that was equipped with an efficient agitator, a nitrogen sparger, and a total reflux condenser, there was charged about 31.5 grams of poly-N-vinyl-2-pyrrolidone (PVP) having a Fikentscher K-value of about 45; about 7.2 grams of monomeric 1-(2-methoxyethoxy)-2 (vinylbenzyloxy) ethane; about 6.3 grams of sodium styrene sulfonate; about 0.5 gram of potassium persulfate; and about 181.8 grams of water. The resulting mixture was brought to a pH of about 6 by acidification with hydrochloric acid. Under continued nitrogen sparging and with continued stirring, the acidified reaction mass was maintained at a temperature of about 60° C. over a 19 hour period. At the end of this time, the reaction was terminated. About 75.5 percent of the monomers were found to have been converted to graft copolymeric product which was obtained as white emulsion of the graft copolymer, containing about 19.8 percent of the water-insoluble graft copolymer solids dispersed in water. Upon analysis, the graft copolymeric product was found to contain about 14 percent of polymerized polyglycol ether monomer units; 11 percent of polymerized sodium styrene sulfonate units; and about 75 percent of PVP.

Polyacrylonitrile fibers containing about 10 percent of the above graft copolymer product were prepared by impregnating filamentary structures that were in aquagel condition (after having been salt-spun and wet-stretched) in and with an aqueous dispersion of the copolymer that contained about 1.5 percent of the graft copolymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contained about 43 percent of dissolved zinc chloride to form a multiple filament tow. After being spun, the tow bundle of coagulated polyacrylonitrile aquagel fiber was washed substantially free from salt upon being withdrawn from the coagulating bath and then wet-stretched for orientation to a total stretched length that was about thirteen times its original extruded length. The aquagel fiber containing about two parts of water for each part of polymer therein, was then passed through the mentioned aqueous impregnating bath of the dissolved graft copolymer additive so as to become impregnated therewith to the indicated extent.

Following the impregnation, the aquagel fiber was irreversibly dried at 150° C. to destroy the water-hydrated structure and convert it to a finished fiber form. The finally obtained 3 denier fiber product had a tenacity of about 4.0 grams per denier, an elongation of about 29 percent and a wet yield strength of about 0.90 gram per denier. The copolymer-containing acrylonitrile polymer fiber product was found to have excellent natural stability to heat and light as well as against becoming degraded under the influence of aqueous alkaline media at pH levels as high as 10. It was found to be nearly free of propensity to accumulate charges of static electricity upon handling.

In addition, the graft copolymer-containing sample had good color and hand and was dyeable with all classes of dyestuffs as applied under normal dyeing conditions.

The fiber product dyed well to deep and level shades of coloration with Calcodur Pink 2BL, a direct type of dyestuff (Colour Index Direct Red 75) and Sevron Brilliant Red 4G, a basic dye formerly known as Basic Red 4G (Colour Index Basic Red 14).

The dyeing with Calcodur Pink 2BL was performed at the 4 percent level according to conventional procedure in which the fiber sample was maintained for about one hour at the boil in the dye bath which contained the dyestuff in an amount equal to about 4 percent of the weight of the fiber. The dye bath also contained sodium sulfate in an amount equal to about 15 percent of the weight of the fiber and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from 0 to 100 was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the graft copolymer-containing fiber product was about 20.

The antistatic properties of the graft copolymer-containing fiber were then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly at it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on a common basis, the conductivities of the samples tested were actually measured as volume resistivities according to the following formula:

$$\text{Volume resistivity} = \frac{(\text{Resistance})(\text{Cross sectional area})}{\text{Path length between electrodes to which sample being tested is attached}}$$

The units of volume resistivity are ohm-cm.$^2$/cm.

Prior to being tested, the graft copolymer-containing polyacrylonitrile fiber prepared in the indicated manner was vat dyed in the conventional manner with Cibanone Green BF Dbl. Paste (Colour Index Vat Green No. 1). A portion of the vat dyed sample was then subjected to five (5) consecutive No. 3–A accelerated wash tests in accordance with the American Association of Textile Chemists and Colorists (AATCC) Manual. The actual resistivities of the merely vat dyed sample as well as that of the sample that had been both vat dyed and scoured were then determined (after the samples being tested were conditioned for seventy-two hours at the particular temperature and relative humidity conditions involved in each of the tests) by tautly connecting a web-like sample of the yarn between two electrodes, each of which were 9 centimeters long spaced parallel 13 centimeters apart, and across which there was applied 900 volt direct current potential. For purposes of comparison, the volume resistivities of cotton, wool and an unmodified polyacrylonitrile fiber (obtained in the same way as the graft copolymer-containing fiber but without having the polymeric additament incorporated therein) were also tested in the indicated manner along with the graft copolymer-containing fiber in accordance with the present invention.

The results are set forth in the following tabulation which indicates the volume resistivities obtained at various relative humidities (R.H.) at 23° C. of each of the samples tested:

*Table 1*

VOLUME RESISTIVITIES OF VARIOUS FIBER SAMPLES COMPARED TO POLYACRYLONITRILE FIBERS IMPREGNATED WITH GRAFT COPOLYMER OF MONOMERIC VINYL BENZYL POLYGLYCOL ETHER AND SODIUM STYRENE SULFONATE ON PVP

| Sample | Volume Resistivity, ohm-cm.$^2$/cm. | |
|---|---|---|
| | 47 percent RH | 66 percent RH |
| Graft Copolymer-containing fiber as made | $1.5 \times 10^{10}$ | $8 \times 10^8$ |
| Graft Copolymer-containing fiber as scoured | $1.8 \times 10^{10}$ | $1.5 \times 10^9$ |
| Scoured cotton | $3.0 \times 10^7$ | $5.4 \times 10^6$ |
| Scoured wool | $1.9 \times 10^{10}$ | $3.3 \times 10^9$ |
| Scoured unmodified polyacrylonitrile | $5 \times 10^{12}$ | $1.2 \times 10^{12}$ |

As is apparent in the foregoing, the graft copolymer-containing sample, even after being severely scoured, had electrical conductance properties much superior to ordinary polyacrylonitrile and only slightly poorer than cotton. At the same time, the physical properties of the copolymer-containing fiber were excellent, being about equal to those of the unmodified polyacrylonitrile fiber.

ILLUSTRATION E

The procedure of the fourth illustration was essentially repeated using the same monomeric vinyl benzyl polyglycol ether to prepare a straight graft copolymer with the monomer from the following charge which was also polymerized in the same way as in the fourth illustration for 19 hours at 66° C.:

| | Grams |
|---|---|
| Monomer | 13.5 |
| PVP (K-value 45) | 31.5 |
| Water | 181.8 |
| Potassium persulfate | 0.5 |
| pH of charge | 6 |

The resulting product was obtained as a white emulsion that contained about 19.8 percent of dispersed water-insoluble graft copolymer solids. Conversion of the monomer to graft copolymer was found to be greater than 50 percent. The graft copolymer product was comprised of about 20 percent of polymerized units of the monomer on the PVP substrate.

The procedure of the fourth illustration was also repeated to apply the graft copolymer product from 1.5 percent aqueous dispersion to a polyacrylonitrile aguagel fiber in order to obtain a fiber product containing about 10 percent of the graft copolymeric additament incorporated therein. The fiber product had excellent dyeability to deep and level shades of coloration with all classes of dyes excepting basic types. Its 4 percent Calcodur Pink 2BL reflectance value was about 22. The antistatic properties of the fiber were evaluated as in the fourth illustration and were found to be excellent. As made, the volume resistivities of the graft copolymer-containing fiber product were found to be about $7.0 \times 10^9$ ohm-cm.$^2$/cm. at 58 percent R.H. and $8.5 \times 10^8$ ohm-cm.$^2$/cm. at 66 percent R.H. After a boiling scour, the volume resistivities of the fiber product containing the graft copolymeric additament were found to be about $1.9 \times 10^{10}$ ohm-cm.$^2$/cm. at 58 percent R.H. and about $2.3 \times 10^9$ ohm-cm.$^2$/cm. at 66 percent R.H. Thus, the antistatic characteristics of the fiber product were much better than that of unmodified polyacrylonitrile and compared quite favorably with wool. Its conductivity was not significantly altered by the boiling scour. In addition, as was the case with the fiber product of the fourth illustration, the stability to heat and light of the graft copolymer-containing fiber product was found to be excellent.

Similar results were also obtained when the foregoing procedure was repeated excepting to prepare the graft copolymer in a reaction mass in which dimethyl sulfoxide was employed as a solvent and azo bisisobutyronitrile the catalyst. The graft copolymer prepared in the organic solvent was separated therefrom and prepared in aqueous emulsion for purposes of impregnating the acrylonitrile polymer fiber.

ILLUSTRATION "F"

An oriented polyacrylonitrile aquagel fiber that contained about 1 part of polymer hydrated with about 2 parts of water was soaked for about 15 minutes at 70° C. in a 9.40 percent aqueous solution of monomer that was a polyglycol-2-vinyl-benzyloxyethane derived from a polyoxyethylene glycol having an average molecular weight of about 600. The wet fiber, after being drained of excess impregnating solution, was sealed in a polyethylene bag and then irradiated by exposing it at room temperature to a high energy, X-ray radiation beam from a Van de Graaff Electrostatic Generator operating under a potential of 2 million electron volts with a 250 microampere beam current impinging on a tungsten target. The monomer-impregnated fiber was subjected to the high energy at a dose rate of about 20 mreps (million roentgen equivalent physicals) per minute until a total dose of about 8 mreps had been obtained. The irradiated yarn was then washed thoroughly with water, dried, heat treated for 5 minutes at 150° C., scoured and then dyed for one hour at the boil in a conventional manner with Amacel Scarlet GB, an acetate type of dyestuff (Colour Index Direct Red 1, also known as Amacel Scarlet BS with American Prototype No. 244). A deep and level shade of coloration was obtained. In contrast, the unmodified yarn could be dyed to only the faintest degree with the same dyestuff. The irradiated yarn was then washed thoroughly with water, dried, heat treated for 5 minutes at 150° C., scoured and then dyed for one hour at the boil in Sevron Brilliant Red 4G. A deep red shade of coloration was obtained. In contrast, the unmodified yarn could be dyed to only the faintest degree with the same dyestuff.

ILLUSTRATION "G"

The procedure of Illustration "D" was repeated excepting to employ a 10 percent solution of a mono-p-vinylbenzyloxyethane ether of a polyoxyethylene glycol having an average molecular weight of about 500 as the impregnating bath. The impregnated aquagel was irradiated at a rate of 6 mrads per second until a total dosage of 10 mrads was effected. After being washed and heat set, separate samples of the graft copolymer fiber product were dyed with both Amacel Scarlet GB and Sevron Brilliant Red 4G. The improvement in dye-receptivity between the graft copolymerized fiber product of the present invention in comparison with unmodified acrylonitrile polymers was such that significant color differentials, easily discernible by visual inspection, were obtained between the dyed graft copolymer composition and the unmodified acrylonitrile polymer fiber. Improved dyeability with Calcodur Pink 2BL was also achieved in the graft copolymerized product.

Results similar to the foregoing may also be obtained when other of the indicated varieties of the monomeric polyglycol esters of alkenyl aromatics of Formula I are prepared or utilized in place of those set forth in the above illustrations and when graft copolymers are prepared on such substrates as poly-N-vinylcaprolactam, poly-N-vinylpiperidone, poly-N-vinyl-5-methyl-2-pyrrolidone and other vinyl lactam polymers using the same or any other of the monomeric components.

Excellent results are also obtained when any of the monomers of Formula I are directly copolymerized with vinyl chloride, styrene and other monomers to provide humectant copolymer products which, when containing at least about 80 weight percent of polymerized acrylonitrile, generally have fiber-forming properties.

What is claimed is:

1. An alkenyl benzyl polyglycol ether of the general formula:

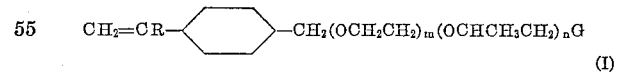

(I)

wherein R is selected from the group consisting of hydrogen and methyl; G is selected from the group consisting of hydrogen, alkyl radicals containing not more than 6 carbon atoms, alkoxy radicals containing from 1 to about 8 carbon atoms, alkylthio radicals containing from 1 to about 8 carbon atoms and halogens of atomic number 17 to 53; $m$ has an average value from about 2 to about 40; and $n$ has an average value of from 0 to about 20 with the limitation that the value of $n$ is always less than that of $m$ and the sum total of $m$ plus $n$ is from about 2 to about 40.

2. 1-(2-ethoxyethoxy)-2(para-vinyl benzyloxy) ethane.

References Cited by the Examiner

UNITED STATES PATENTS 2,791,567   5/57   Lowe et al. _____ 260—611

LEON ZITVER, Primary Examiner.

CHARLES E. PARKER, Examiner.